UNITED STATES PATENT OFFICE.

GUSTAV ADOLF PIEPER, OF ROTTERDAM, NETHERLANDS.

PREPARING COCOA.

SPECIFICATION forming part of Letters Patent No. 571,238, dated November 10, 1896.

Application filed December 30, 1895. Serial No. 573,823. (No specimens.)

*To all whom it may concern:*

Be it known that I, GUSTAV ADOLF PIEPER, of Rotterdam, in the Kingdom of the Netherlands, have invented a certain new and useful Improvement in the Manufacture of Cocoa; and I do hereby declare that the following is a full, clear, and exact description of the invention, which will enable others skilled in the art to which it appertains to use the same.

My invention relates to improvements in the manufacture of cocoa from the cocoa-beans of commerce, or, in other words, to an improved treatment of such beans in the manufacture of cocoa therefrom.

In the treatment heretofore generally applied in the manufacture of cocoa from the cocoa-beans of commerce the product obtained is very indigestible, because the most valuable alimentary substances thereof, that is to say, the nitrogenous constituents, are contained in the manufactured product in the acid state and, therefore, not adapted to be readily assimilated by the organs of digestion.

The object of my present invention is to render the alimentary substances contained in very large quantities in the cocoa-beans of commerce easily digestible in the manufactured product, so that the latter may agree well even with persons of delicate health and may be readily digested by such persons without causing them any trouble or inconvenience.

To this end my invention consists in subjecting the cocoa-beans of commerce to a process of neutralization and fermentation, or vice versa, in a manner to be more fully hereinafter described, and subsequently roasting, cleaning, and grinding the same.

By the term "cocoa-beans of commerce" I mean the raw, dry cocoa-seeds in the condition in which they are usually obtained on the market, they being then still surrounded by a dry, brittle shell. After having first removed the said shell from the cocoa-beans in any usual and well-known manner, I proceed as follows in carrying my invention into effect, that is to say, I take hot water, the quantity preferably employed thereof being from ten to twelve per cent., more or less, by weight of the cocoa-beans to be treated, and I dissolve in the water a quantity of from about one-fourth to two and one-half per cent. of the weight of the beans of any suitable alkali, such as carbonate of soda, potash, or ammonia. If the beans to be treated are in a highly acid state, then it will be preferable to employ a larger percentage of alkali than if they are less so. The water thus rendered alkaline is added to the beans in such a manner as to thoroughly moisten the latter, and the effect of such moistening is that the free acids contained in the beans become neutralized and the albumens, which, as is well known, are highly indigestible in their acid state, are transformed into readily-digestible albuminates. It will, of course, be understood that the quantity of alkaline water added, or the percentage of alkali contained therein, will not be sufficient to act upon the butter in the cocoa-beans thus treated, because, on the one hand, the butter is at this stage of the process still in combination with other substances of an acid character in the cells of the beans, and, on the other hand, the alkali added will first of all act upon the free acids in the beans and will become fully absorbed in this office alone. The cocoa-beans after having thus become neutralized are then subjected to fermentation. This is effected by allowing the neutralized mass to remain under a temperature of from 20° to 40° centigrade, more or less, preferably in a wooden vat, and for such a length of time until the cocoa will have assumed a fragrant, fruit-like flavor. This will be found to be the case after from twenty-four to forty-eight hours, well-matured cocoa-beans and such of good quality requiring less time, while immature beans or such of poor quality will require more time. As soon as the mass has assumed the above-mentioned flavor, and when I find that a slight rise in the temperature sets in, I interrupt the process of fermentation by removing the mass from the vat. The mass of cocoa, which during the process of fermentation will have assumed a loose and spongy condition, is now roasted, cleaned, and ground in the usual and well-known manner.

The fact that fermentation sets in upon the cocoa-beans having been subjected to the above-described process of neutralization and subsequently brought in contact with water and allowed to remain under a temperature such as described, may be attributed to the circumstance that some natural ferment originally contained in the beans themselves is rendered active by the combined action of the neutralized acids, albuminates, and swelled starch in the presence of water and heat. In some cases, instead of making use of this natural ferment, which I assume to be contained in the commercial cocoa-beans, and first neutralizing the acids for this purpose, I may also reverse the two steps by first subjecting the cocoa-beans to fermentation and then to neutralization. In this case I proceed as follows, that is to say: I moisten the beans, in the same condition as in the process first described, with the water, but without adding thereto any alkali. I then add to, say, one hundred pounds of the moistened beans about half a gallon of extract of malt, which I prepare by mixing with half a gallon of water, at a temperature of about 40° centigrade, about three and one-half ounces of ground malt, and digesting with the water for about half an hour. I then allow the mass to remain under a temperature of from 30° to 40° centigrade, as in the process first described, and for the same length of time, and I afterward interrupt the fermentation under the same conditions as there explained. I then neutralize the fermented mass by adding to the same from ten to twelve per cent., more or less, of the weight of the fermented mass, of alkaline water, prepared in the same manner as already described with reference to the first-named process, and subsequently I subject the fermented and neutralized mass to the usual and well-known operations of roasting, cleaning, and grinding. In either case, no matter whether the process may have been applied in the one or the other manner, as described, it will be found that in the finished product the starch will, to the greater extent, have been transformed into soluble dextrin and that part of the albumens will be present in the product in a peptonized state. Thus the alimentary substances contained in the commercial cocoa-beans will, by means of my improved process, be rendered readily digestible. It has also been found that my improved process has the effect of giving the manufactured product a finer flavor than has been possible heretofore to obtain by means of any other treatment known, and that it greatly improves the color of the cocoa by imparting to the product a bright reddish-brown hue.

Having thus described my invention, what I claim is—

1. The method or process herein described of manufacturing cocoa from cocoa-beans of commerce, which consists in first moistening the beans with an alkaline solution to neutralize the acids therein, and then subjecting the beans to fermentation, substantially as set forth.

2. The method or process herein described of manufacturing cocoa, which consists in moistening cocoa-beans with an alkaline solution and thereby neutralizing the acids therein, adding a ferment to the beans, and roasting, cleaning, and grinding said beans, substantially as set forth.

In testimony whereof I have signed my name to this specification in the presence of two subscribing witnesses.

GUSTAV ADOLF PIEPER.

Witnesses:
  ROBERT R. SCHMIDT,
  H. E. SCHMIDT.